United States Patent
Ge et al.

(10) Patent No.: US 10,774,235 B2
(45) Date of Patent: Sep. 15, 2020

(54) NANO-STRUCTURE COATED SHEETS/FILMS FOR OPTICAL ELECTRONIC DISPLAYS AND PHOTOVOLTAIC MODULES

(75) Inventors: Jiaxin Jason Ge, Lower Providence, PA (US); Michael T. Burchill, Langhorne, PA (US); Ravi R. Gupta, Pottstown, PA (US); Scott Gaboury, Blue Bell, PA (US)

(73) Assignee: Arkema France, Colombes (FR)

( * ) Notice: Subject to any disclaimer, the term of this patent is extended or adjusted under 35 U.S.C. 154(b) by 139 days.

(21) Appl. No.: 13/126,374

(22) PCT Filed: Oct. 9, 2009

(86) PCT No.: PCT/US2009/060095
§ 371 (c)(1),
(2), (4) Date: Jun. 23, 2011

(87) PCT Pub. No.: WO2010/051149
PCT Pub. Date: May 6, 2010

(65) Prior Publication Data
US 2011/0250435 A1    Oct. 13, 2011

Related U.S. Application Data

(60) Provisional application No. 61/108,584, filed on Oct. 27, 2008.

(51) Int. Cl.
| B32B 5/16 | (2006.01) |
| B05D 5/06 | (2006.01) |
| C09D 133/16 | (2006.01) |
| C09D 127/16 | (2006.01) |
| B82Y 30/00 | (2011.01) |
| C08J 7/04 | (2020.01) |

(52) U.S. Cl.
CPC ........... C09D 133/16 (2013.01); B82Y 30/00 (2013.01); C08J 7/0427 (2020.01); C09D 127/16 (2013.01); C08J 2333/12 (2013.01); C08J 2427/16 (2013.01); C08J 2451/00 (2013.01); Y10T 428/25 (2015.01)

(58) Field of Classification Search
USPC ....................................... 428/323
See application file for complete search history.

(56) References Cited

U.S. PATENT DOCUMENTS

| 4,226,904 A | 10/1980 | Ollivier et al. |
| 4,317,860 A | 3/1982 | Strassel |
| 5,132,164 A | 7/1992 | Moriya et al. |
| 5,256,472 A | 10/1993 | Moriya et al. |
| 5,873,931 A | 2/1999 | Scholz et al. |
| 6,811,859 B2 | 11/2004 | Bonnet et al. |
| 7,217,746 B2 | 5/2007 | Munro et al. |
| 7,390,099 B2 | 6/2008 | Takao et al. |
| 2004/0019145 A1* | 1/2004 | Imoto et al. ................... 524/502 |
| 2004/0169928 A1* | 9/2004 | Nilsen .............. B29D 11/00605 359/529 |
| 2005/0233083 A1* | 10/2005 | Schulz .................... B29C 59/14 427/342 |
| 2006/0148971 A1* | 7/2006 | Jing ......................... C08J 3/005 524/520 |
| 2006/0229406 A1 | 10/2006 | Silverman et al. |
| 2006/0264563 A1* | 11/2006 | Hanrahan et al. ............ 524/544 |
| 2007/0020404 A1* | 1/2007 | Seiberle ................ B29C 41/003 428/1.2 |
| 2007/0154704 A1 | 7/2007 | Debergalis et al. |
| 2008/0161468 A1* | 7/2008 | Juikar ..................... C08F 14/18 524/423 |
| 2009/0122310 A1* | 5/2009 | Zhang .................... B82Y 15/00 356/301 |

OTHER PUBLICATIONS

Ha, Jong-Wook, et al, "Antireflection Surfaces Prepared from Fluorinated Latex Particles", Macromolecules, 2008, Published on Web, pp. A-G.

\* cited by examiner

*Primary Examiner* — Cheng Yuan Huang
(74) *Attorney, Agent, or Firm* — Thomas F. Roland

(57) ABSTRACT

The invention relates to a thin, nano-structured coating that provides optical light efficiency enhancement. The dried coating contains nano-structures that provide a very low haze level of less than 2 percent, and a light transmission improvement of at least 1% over the non-coated substrate. For the nano-structured coating on an acrylic substrate the transmission is greater than 93 percent, and preferably greater than 94 percent. The coatings of the invention are especially useful for optical electronic displays and photovoltaic modules.

12 Claims, 2 Drawing Sheets

24% Modified Aquatec (@2900rpm) over 3mm PMMA MC sheet

–◇– 3mm PMMA MC    –◆– 24% Modified Aquatec at 2900 rpm/30sec

Modified Kynar Aquatec Coating on 170 um PC film

–◇– 170 um PC film    –■– Aquatec on 170 um PC film ~1um dry

X-linked KYNAR AQUATEC coating over PMMA sheets x  0.500 μm/div
z  100.000 nm/div

NANO-STRUCTURE COATED SHEETS/FILMS FOR OPTICAL ELECTRONIC DISPLAYS AND PHOTOVOLTAIC MODULES

FIELD OF THE INVENTION

The invention relates to a thin, nano-structured coating that provides optical light efficiency enhancement. The dried coating contains nano-structures that provide a very low haze level of less than 2 percent, and a light transmission improvement of at least 1% over the non-coated substrate. For the nano-structured coating on an acrylic substrate the transmission is greater than 93 percent, and preferably greater than 94 percent. The coatings of the invention are especially useful for optical electronic displays and photovoltaic modules.

BACKGROUND OF THE INVENTION

Optical electronic displays are widely found in handheld devices such as cellular phones, MP3 players and other portable electronic devices. The inorganic glass front panels on these devices are usually clear and fragile. A protective layer of highly optical transmission films/sheets is generally laminated on top of the glass panel displays. There is a need to further improve the light transmittance of the protective layer in terms of higher light efficiency/brightness and a low haze level of <2%, and even <1% in a photopic region. Additionally, any protective layer should be easy to apply and have good chemical resistance, scratch resistance and dirt-shedding performance.

Photovoltaic (PV) modules generally have low iron tempered glass front panels, due to high light transmittance (>90.5%) and excellent weathering performance. However, the glass front panels are usually heavy (bulk desity ~2.5 g/cm3) and fragile. A solution is to laminate a polymeric film onto a thinner glass substrate to improve the performance in terms of light efficiency, dirt shedding and impact resistance, and even to use plastic sheets to replace the glass panels.

Acrylic sheet, such as PLEXIGLAS polymethyl methacrylate (PMMA) sheet (Arkema Inc.) is an optically clear plastic product developed at Altuglas International with superior optical clarity and excellent weathering performance as well as light weight (bulk density=1.2 g/cm3). The optical PMMA sheets are considered a good candidate substrate to replace the glass panels for both PV module and electronic display applications.

Polyvinylidene fluoride (PVDF) films have been laminated (U.S. Pat. No. 4,226,904) and extruded (U.S. Pat. No. 4,317,860) onto PMMA sheets to improve the chemical resistance. Multi-layer films having a PVDF outerlayer and a PMMA inner layer have been laminated/adhered onto differenent substrates, including glass and plastics (U.S. Pat. Nos. 5,132,164; 6,811,859). Multi-layer PVDF/PMMA films have been used for PV protective coatings (U.S. Pat. No. 7,267,865).

"Moth-eye" anti-reflective coatings, having a particulate structure have been applied to both inorganic and organic substrates by an etching process. The anti-reflective nano moth-eye structures have been developed at a small scale based on low pressure plasma or ion etching surface treatment (with irregular 3D nano moth-eye structure DE 10241708.2) or complicated laser holographic/lithographic fabrication technologies on master structures (with periodic 3D niotheye structures at the size of ~250 nm). Physical application of a nanostructure surface patern by stamping or the use of a matte roller in a sheet formation manufacturing process. Moth-eye anti-reflective coatigs are not currently produced based on wet chemistry.

PVDF coatings have been applied to thermoplastic substrates in both flexible and non-flexible PV front sheet (WO 08/019229; US 60/989,501). These coatings tend to be thick (>5 microms), and are formed from polymers having a large (>~300 nm) particle_size. The current PVDF and other fluorpolymer coating technologies tend to be hazy which is undesirable for portable electronic device screens.

Surprisingly it has been found that optically clear coatings, and especially fluoropolymer coatings, can be applied to a substrate in a process resulting in a particulate or "moth eye"-type nano-structure. This nano-structured coating provides improved_chemical and scratch resistance, yet also gives improved optical light transmittance and very low haze by reducing the light reflection. The nano-structure is preferably cross-linked for stability of the structure.

SUMMARY OF THE INVENTION

The invention relates to a coated substrate, where the substrate is optically clear, and the coating is an optically clear polymeric coating, having a dry thickness of less than 15 microns; where the dry coating comprises distinct, nano-structured particles having an average particle size of less than 300 nm, and where the coating is directly adhered to the substrate, and wherein the light transmittance at a wavelength or 550 nm is greater than 93 percent foe an acrylic substrate. The improvement in light transmission is great than 1 percent when compared with the non-coated substrate. In a preferred embodiment the nano-structured particles are crosslinked.

The invention also relates to a process for forming a nano-structure coated substrate from a solvent or aqueous solution or dispersion by applying the coating to an optically clear substrate, crosslinking the coating composition before coalescence, and drying the composition. The dry coating contains distinct, cross-linked nano-structured particles having a particle size of less than 300 nm, and the light transmittance of the coating at a wavelength or 550 nm is greater than 94 percent.

DETAILED DESCRIPTION OF THE INVENTION

Figure 1:
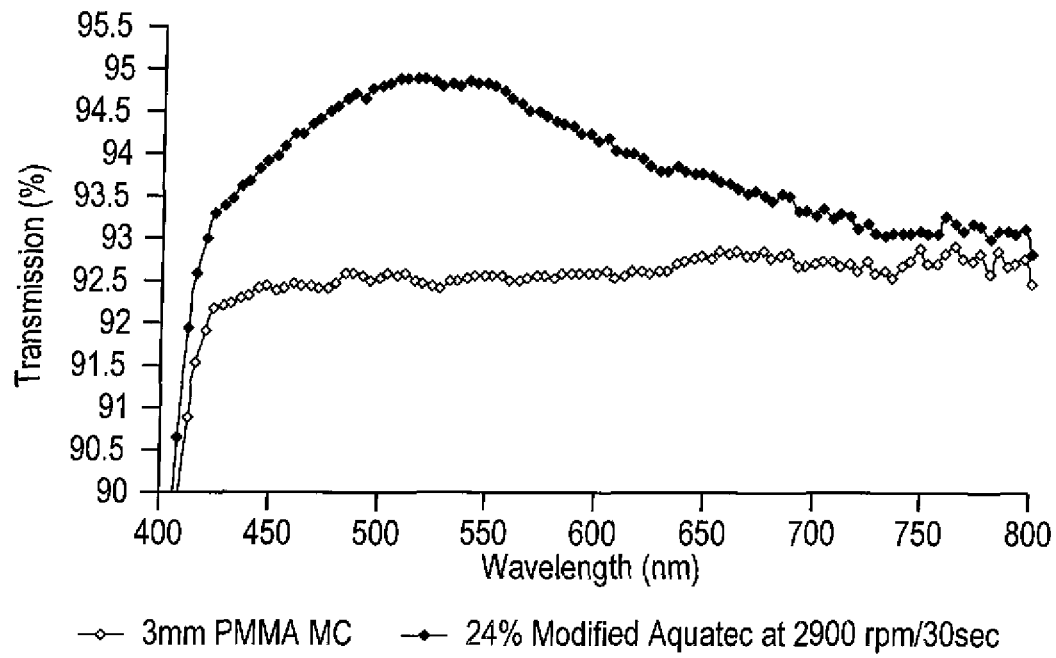
FIG. 1 shows the improvement in light transmission for a PMMA sheet with and without the coating of the invention at different wavelengths.
Figure 2:
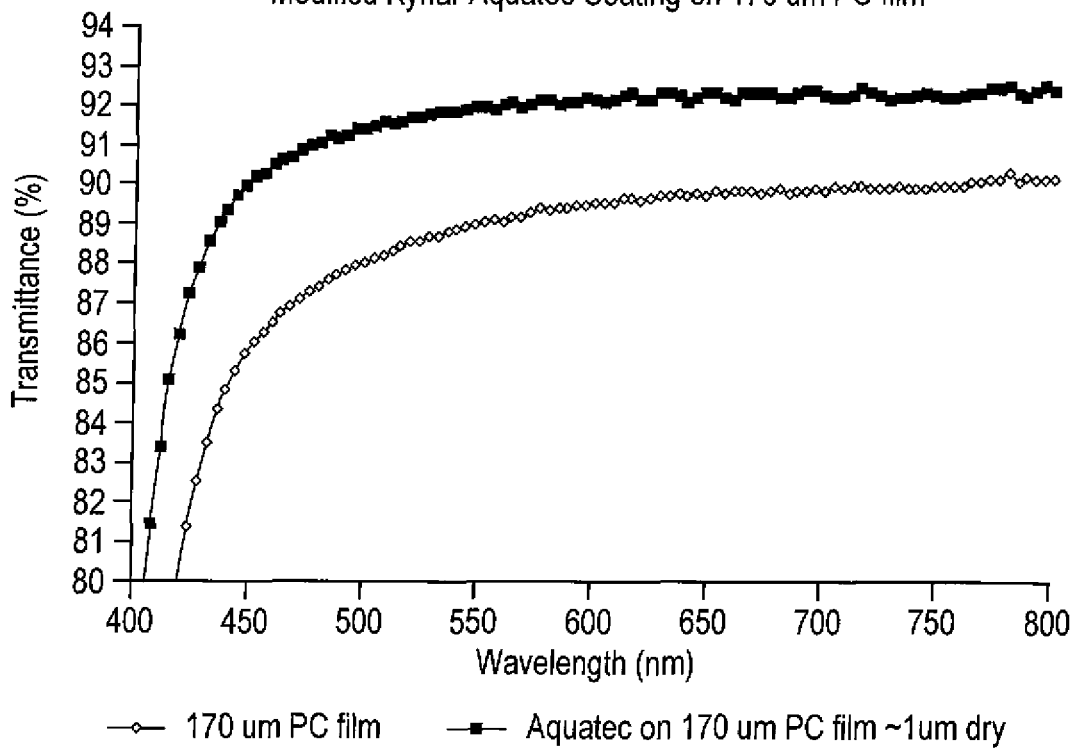
FIG. 2 shows the improvement in light transmission for a polycarbonate sheet with and without the coating of the invention at different wavelengths.
Figure 3:
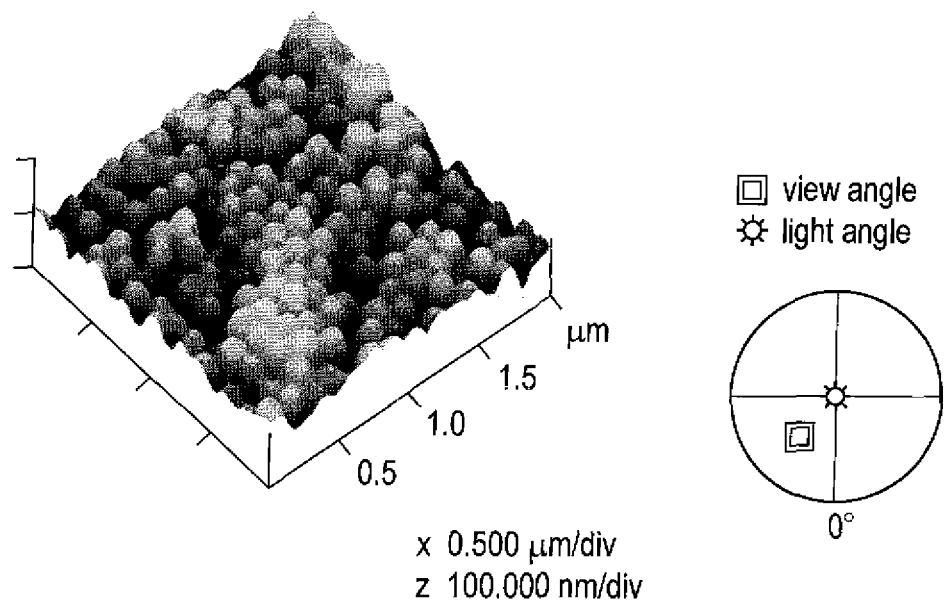
FIG. 3 shows an AFM 3D image of a PMMA sheet having the coating composition of the invention, showing the particle nano-structure.

The invention relates to a nanostructured polymer coating for use on an optically clear substrate, forming a light-transmitting layer of a device, such as a PDA, cell phone, or photovoltaic module. The nano-structured coating improves the optical light transmittance, weathering resistance and dirt shedding for the device.

By "optically clear" as used herein is meant a material having a haze level of less than 5%, preferably less than 2% and more preferably less than 1%, as determined by ASTM D1003.

The coatings of the present invention include both aqueous and solvent coatings capable of forming nano-sized particles in the final dry coating, within the requirements of the invention. In a preferred embodiment, the coating is an aqueous emulsion or dispersion coating. Aqueous coatings are more environmentally "green" than their solvent counterparts, and are also easier to handle and clean up.

The coating composition contains at least one polymer binder, or mixture of polymers, capable of forming a clear coating. The polymer binder composition can be formed by means known in the art—including solution, suspension, emulsion, and inverse emulsion polymerization processes. Ideally the polymer is chosen so the final dry coating is scratch resistant, chemically resistant and dirt shedding. In one embodiment, the polymer binder is an acrylic polymer. In a preferred embodiment, the polymer binder for the coating composition is one or more fluoropolymers, including acrylic fluoropolymer blends, and acrylic-modified fluoropolymers.

The term "fluoromonomer" as used according to the invention means a fluorinated and olefinically unsaturated monomer capable of undergoing free radical polymerization reaction. Suitable exemplary fluoromonomers for use according to the invention include, but are not limited to, vinylidene fluoride (VF2), vinyl fluoride (VF), trifluoroethylene, tetrafluoroethylene (TFE), and hexafluoropropylene (HFP) and their respected copolymers. The term "fluoropolymer" refers to polymers and copolymers (including polymers having two or more different monomers, including for example terpolymers) containing at least 50 mole percent of fluoromonomer units. A preferred fluoropolymer is polyvinylidene fluoride and its copolymer.

A particularly useful fluoropolymer coating composition is an acrylic-modified fluoropolymer dispersion, formed by first synthesizing a fluorpolymer seed polymer, then polymerizing one or more acrylic monomers in the presence of the fluoropolymer seed polymer. The fluoropolymers that can be used as the seed particles for this invention include vinylidene fluoride ($VF_2$) homopolymer, and copolymers of vinylidene fluoride with one or more other ethylenically unsaturated compounds. The other ethylenically unsaturated compounds include, but are not limited to those containing fluorine (e.g. trifluorochloroethylene, tetrafluoroethylene, hexafluoropropylene, vinylfluoride, perfluoroacrylic acid), a diene compound (e.g. butadiene, isoprene, chloroprene), and a non-fluorinated ethylenically unsaturated compounds (e.g. cyclohexy vinyl ether). The preferred fluoropolymer composition contains 50 to 100 parts by weight of vinylidene fluoride homopolymer, and preferably 70 to 100 parts; 0 to 30 parts by weight of hexafluoropropylene; and 0-30 parts by weight of any other monomer mentioned above).

The aqueous fluoropolymer dispersion can be produced by any conventional emulsion polymerization method as long as the average fluoropolymer particle size remains under 300 nm, more preferably under 250 nm. The aqueous fluoropolymer dispersion can be prepared for instance by emulsion polymerization of the monomers in an aqueous medium, in presence of a surfactant, an initiator, a chain transfer agent, and a pH adjusting agent. The fluoropolymer dispersion is preferably synthesized using free-radical initiation. Chain transfer agents, buffering agents, antifoulants, and other additives typically used in a fluoropolymer emulsion process, may also be present.

The average particle size in the final dry coating composition of the invention must be below about 300 nm, to be below the wavelength of optical light, and thus promoting low-haze. Preferably the weight average particle size is below 250 nm and preferably from 80-200 nm. In one embodiment it has been found that a range of from 130-160 nm for the average particle size is useful. In another embodiment average particle sizes in the range of 150-190 nm were useful. In another embodiment, larger average particle sizes, in the 200-250 nm range could be better. Advantageously, the particle size distribution will be narrow, to allow for more efficient packing of the particles into the preferred hexagonal or pseudo-hexagonal structure. In a preferred embodiment, 90 weight percent of the particles fall within +/−50 percent of the average particle size, preferably +/−30 percent, and more preferably +/1 20 percent of the weight average particle size. In another embodiment, 90 percent of the particles by volume are between 120 and 250 nm, and preferably between 140-200 nm.

The coating composition of the invention is applied to an optically clear substrate. The substrate can be an inorganic glass, or can be a thermoset or thermoplastic material. The substrate could be a thick, inflexible sheet, a thin film, or anything in between. In the case of a thin film, the nano-structured coating could be applied to a film to create a multi-layer film, which could further be applied to another optically clear substrate.

Useful clear substrates include, but are not limited to, inorganic glasses, polycarbonate (PC); polystyrene (PS); polyurethanes (PU); polyalkylene terephthalates such as polyethylene terephthalate (PET) and polybutylene terephthalate (PBT), polyesters, styrene/acrylonitrile copolymer, polyolefins, poly(vinyl chloride), chlorinated poly (vinyl chloride), PETG, imidized acrylic polymer, acrylic polymers, and their copolymers—including block copolymers and random copolymers.

Preferred substrates are polycarbonate and acrylic (co) polymers. By "acrylic", as used herein, includes polymers, copolymers and terpolymers formed from alkyl methacrylate and alkyl acrylate monomers, and mixtures thereof. The alkyl methacrylate monomer is preferably methyl methacrylate, which may make up from 50 to 100 weight percent of the monomer mixture and preferably at least 70 weight percent. 0 to 50 percent of other acrylate and methacrylate monomers or other ethylenically unsaturated monomers, included but not limited to, styrene, alpha methyl styrene, acrylonitrile, and crosslinkers may also be present in the monomer mixture. Other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methyl acrylic acid and acrylic acid can be useful for the monomer mixture.

The substrate and coating composition may also contain low levels of additives, including but not limited to, UV stabilizers, plasticizers, fillers, lubricants, coloring agents, dyes, biocide, fungicide, antioxidants, impact modifiers, pH adjusters, antistatic agents, surfactants, toner, and dispersing aids may also be present at low levels in the thermoplastic. Any additives should be chosen and used at minimal levels, to avoid interference with the transmission of solar radiation through the glazing.

A key to the invention is the formation of nano-structured particles in the final dried film having an average of less than 300 nm. The formation of a nano-structured film is a complicated balance between particle stability and coalescence into a continuous film. The coating of the present invention requires both a high level of distinct nano-structured particle to provide the high-transmission (by lowering the light reflection) and low haze, and also a continuous film layer to provide full coverage of the substrate and the desired protective properties. There are several ways to achieve this kinetic balance. Some of these methods are described below. One of ordinary skill in the art, based on the examples below and the requirements stated in this application, can envision other methods to achieve the coated substrate of the invention.

In a first embodiment, the coating composition is diluted with solvent or water, to increase the spacing between particles. The diluted coating is applied to the substrate as either a thin single pass, or as two or more successive coatings. As the coating dries, there is a minimum of particle interaction and coalescence, creating individual dried particles. Successive layers of individually formed particles, either due to an initial single thin wet coating, or by successively added dilute layers created individual particles that are pressed into gaps between prior formed particles, creating a continuous blanket of particles that remain, for the most part, as distinct, packed particles. To aid in the formation of the distinct nano-particles, anti-coalescent additives may be used. This procedure produces the good results described in this invention. The down side of this method is that if the packed-particle layer is exposed to high heat (60-80° C.), the particles will begin to coalesce, and the high-transmission performance will be lost.

In a preferred embodiment, a thin layer of the liquid coating composition is applied to a substrate, and prior to drying, the particles are crosslinked. The cross-linked particles can pack together without coalescing—thus forming a continuous layer of discrete particles. An advantage of this method is that the crosslinked particles do not coalesce, even overlong periods of time, or at elevated temperatures.

Useful cross-linking mechanisms include, but are not limited to irradiation, reaction of functional groups in the polymer(s), or through the use of chemical cross-linking agents. The crosslinking mechanism can be heat activated, and crosslinks form during the heat curing (drying) of the film. Useful crosslinkers include, but are not limited to triaziridine, polyaziridine, glycidoxy propyl trimethoxy silane, glycidoxy propyl triethoxy silane, epoxy silane, beta-(3,4-epoxycylohexyl) ethyl triethoxy silane and their blends. The cross-linking agent is present in the composition at from 0.5% to 20%, preferably from 1% to 10%.

The coating is applied to the substrate by means known in the art, including inkjet, spincoat, roll-coat, brush-coat, gravure print, flexographic print, thermal transfer coat or spray coating. A roll-to-roll continuous coating process may also be used. Depending on the substrate and polymer in the coating, the substrate may be surface treated (such as with a plasma or corona treatment) to increase adhesion of the coating. Tie-layers would generally not be used in the present invention, as they would increase the haziness. During the process, a large percentage of the individual particles must be maintained and cross-linked prior to coalescence. Coalescence may be hindered to aid particle formation in the coating. In one embodiment, it was found that when both sides of the substrate are coated with the nano-structured coating, that the transmission improvement can be further increased.

The packing structure of the nano moth-eye on the surface is close to hexagonal or psuedohexagonal. In one embodiment the final (dry) coating contains particles of 130-160 nm in width, with the depth of the nano-structure in the range of from 20 to 100 nm, and more preferably from 30-75 nm indepth.

Thin single layer coatings are preferred, as they provide low haze levels, and require less coating composition—and thus are less costly. Final single layer coating thicknesses are preferably less than 15 microns, more preferably less than 10 microns, more preferably less than 5 microns, even more preferably less than 3 microns, and most preferably from 300 nm to 2 microns. For ease of manufacture, it is preferred that the coating can be applied in a single pass application, and even 2 or 3 applications of a dilute coating could be used. Coatings on both sides of the substrate may also be made, and result in further increases in light transmission.

The nano-structure coating improves the light transmission of the coated substrate by at least 1%, more preferably at least 1.5% and as much as 2% or more compared to the uncoated substrate.

The moth-eye structure can have a gradient refractive index along the z-direction from the substrate to air to improve optical transmittance efficiency by reducing the surface light reflection. The coated fluoropolymers or copolymers preferably possess a lower refractive index (n=1.42-1.43) than that of the substrate (ie. PMMA and PMMA copolymers n=1.47-1.49, PS n=1.58, PC n=1.59), which could reduce the surface light reflection to improve the light transmission.

In one embodiment of the invention, modified KYNAR AQUATEC fluoropolymer coatings (Arkema Inc.) are applied to 3 mm clear PLEXIGLAS MC sheets with the wet thickness of 2-50 um and baked at 50-90° C. The KYNAR AQUATEC coating contain ~30% acrylate copolymers (and even 50% containing methacrylic acid (MAA) or hydroxyethylmethacrylate (HEMA)) with exceptional weathering performance and excellent dirt shedding. It can be dried at ambient temperature and thermally cured at low temperature (50-90° C.).

High quality crosslinkable KYNAR AQUATEC single layer coated PMMA PLEXIGLAS MC sheets exhibited higher optical transparency of 93.0%, preferably above 93.55 and most preferably above 94% in the visible wavelength at 550 nm, as compared to 92.5% in the control PLEXIGLAS MC sheets. The light transmission can even be over 95%. In addition to finding a lower refractive index of (n=1.42-1.43) for the coated sheet, the additional enhancement in transmittance can be explained based on the formation of nano moth-eye structure on the surface of the coated sheets/films. The AQUATEC coated PMMA sheets passed the crosshatch peel-off adhesion tests with no delamination as ranked at 5B (100%). After the chemical crosslinking, the surface hardness was improved up to 1H-3H from 1B-2B in the original control coating. In addition, the crosslinked samples are chemically resistant to IPA, EtOH, MeOH, and 70% IPA based rubbing alcohol in spot tests.

Similar results were seen on PMMA films and PMMA block copolymer substrates.

An additional advantage of the coating process of the invention is that the processing temperature is lower than for a lamination or coextrusion process. The process is also suitable for field applications.

In addition to intrinsic dirt shedding performance from the KYNAR AQUATEC fluoropolymer coatings, after adding the biocide/fungicide agent such as MERGAL 680 into the coating solutions, the surface anti-microbial performance of coated sheets/films has been improved.

A additional surprising observation on the coating of the present invention relates to the lowering of the percieved refractive index (RI) of a nano-structured coating. It was found that the modified AQUATEC coatings used in the preferred embodiment of the invention, (having a RI of about 1.42), displayed an effective RI of 1.35-1.37 in a single layer nano-structured coating. It is known that larger differences in refactive index between the substrate and a second layer (coating or film) provide a greater anti-reflectance. Thus the acrylic modified fluoropolymer nano-structured coating (having a lower effective RI), when used on an acrylic stubstrate, leads to a greater difference in RI between the coating and substrate. This may partially explain the advantages seen with a nano-structured coating when compared to a continuoues fully-coalesced coating.

EXAMPLES

Except as otherwise noted, all percentages are weight percentages and all molecular weights are weight average molecular weights.

KYNAR AQUATEC coatings were formulated in the lab, by adding a small amount of ammonia (28% aq) into RC10,206 fluoropolymer emulsion to adjust the pH level to 8.5-8.9, along with some amount of coalescent (DPM), thickener (RM8W) and biocide/fungicide MERGAL 680. The chemical crosslinking agents will be also used at ambient temperature or elevated temperature to improve the coating hardness and chemical resistance. With adding suitable amount of coalescent dipropylene glycol methyl ether (DPM) and thickener (RM8W), no specific primer is required for the KYNAR AQUATEC solution coatings on PMMA and PMMA copolymer sheet and/or film products (containing over 50% of PMMA copolymers) or polycarbonate (PC) sheet. The filtration of the solutions is desired to remove the mechanical impurities at the size of 1-10 um. Based upon the formation of the anti-reflective nano moth-eye structure on the surfaces of coated sheets/films at a large scale, we can obtain a much better optical transmittance, including higher light harvesting efficiency for PV modules and higher brightness for electronic optical displays.

| | | |
|---|---|---|
| KYNAR AQUATEC RC10,206 | 92 gm | Arkema Inc. |
| Ammonia (28% aq) | 0.16 gm | |
| DiPropylene Glycol Methyl Ether (DPM) | 6.62 gm | |
| ACRYSOL RM-8W | 0.51 gm | Rohm and Haas |

In the Examples below, the optical transmission was measured at 550+/−2 nm nm using a Perkin Elmer Lambda 850/800 UV/Vis or Lambda 19 spectrophotometer with an integrating sphere in a transmission mode. The haze was measured at the BYK Gardner Haze meter in a photopic region (550-560 nm). The nano moth-eye surface morpgology was measured in AFM and SEM.

The formation of anti-reflective nano moth-eye like structure coatings at low temperature on top of optical clear or translucent plastic sheets/films based on water-borne or solvent-borne coating processes. The coating processes could include roll-to-roll, spray coatings, spinning coatings, flow coatings, dip coatings, screen coatings, and brush-on coatings. The solution coatings can be applied not only to flat optical panel surfaces but also to formed curvature optical parts (glass or plastics) directly which the lamination technology cannot be used easily.

Example 1

| Aqueous Latex Example 1 Latex Formulation | Amount (gm) |
|---|---|
| KYNAR AQUATEC RC-10,206 (70:30 PVDF-HFP:Acrylic at 50% solids) | 92 |
| Ammonia (28% aq.) | 0.16 |
| ACRYSOL RM-8W thickener (associative thickener) | 0.51 |
| Dipropylene glycol methyl ether (DPM) | 6.62 |
| Water | 92 |
| Total | 191.29 |

KYNAR AQUATEC fluoropolymer coating was first diluted with D. I. water and then applied to 3 mm clear PLEXIGLAS acrylic sheets with the controlled wet thickness of shown in the table microns, and were baked at 60° C. for 1 hour. High quality modified KYNAR AQUATEC coated PMMA sheets exhibited higher optical transparency of up to 94% in the visible wavelength, as compared to 92.5-92.6% in the control PLEXIGLAS acrylic sheets. The average haze levels of the coated sheets were controlled to less than 1.5%. The dry thickness of the coating on top of the PMMA sheet was near or at less than 3 um while the cross section of the sample was measured from the optical microscope or SEM. Modified KYNAR AQUATEC coated PMMA sheets passed the crosshatch peel-off adhesion tests with no delamination as ranked at 5B (100%). The periodic structure of the nano moth-eye is about 160 nm. The depth of the nano moth-eye is in the range of from 30-75 nm. The packing structure of the nano-structured moth-eye is close to hexagonal or pseudohexagonal.

TABLE 1

Modified KYNAR AQUATEC Coatings on 3.0 mm PMMA Sheets

| Single layer coated PMMA sheets | Transmission (%, 548 nm) | Transmission (%, 632 nm) | Haze (%, 560 nm) |
|---|---|---|---|
| 3µ KYNAR AQUATEC-on-PMMA | 93.44 | 93.31 | 0.49 |
| 3µ KYNAR AQUATEC-on-PMMA | 93.41 | 93.30 | 0.54 |
| 2µ KYNAR AQUATEC-on-PMMA | 93.57 | 93.56 | 0.42 |
| 2µ KYNAR AQUATEC-on-PMMA | 93.41 | 93.40 | 0.54 |
| ~1µ KYNAR AQUATEC-on-PMMA | 93.99 | 93.99 | 1.02 |
| ~1µ KYNAR AQUATEC-on-PMMA | 93.92 | 93.98 | 1.04 |
| 3.0 mm PMMA control | 92.54 | 92.61 | 0.13 |
| 3.0 mm PMMAcontrol | 92.59 | 92.63 | 0.16 |

Example 2

| Aqueous Latex Example 2 Latex Formulation | Amount (gm) |
|---|---|
| KYNAR AQUATEC RC-10,206 (70:30 PVDF-HFP:Acrylic at 50% solids) | 92 |
| Ammonia (28% aq.) | 0.16 |
| ACRYSOL RM-8W thickener (associative thickener) | 0.51 |
| Dipropylene glycol methyl ether (DPM) | 6.62 |
| Water | 92 |
| COATOSIL 2287 epoxy silane (GE) | 1 |
| Total | 192.29 |

Optical clear KYNAR AQUATEC coatings were diluted and modified with a COATOSIL 2287 silane cross-linking agent and then spincoated over to 2.1 mm clear PLEXIGLAS acrylic sheets at ambient temperature. The coated samples were thermally cured at 85° C. for 30 minutes. The haze level of modified KYNAR AQUATEC coated acrylic sheets was controlled <1.5%, as listed in Table. KYNAR AQUATEC coated PMMA sheets passed the crosshatch peel-off adhesion tests with no delamination as ranked at 5B (100%). The periodic structure of the nano moth-eye is at the scale of about 163 nm. The depth of the nano moth-eye is ranged from 35-75 nm. The packing structure of the nano moth-eye is close to be hexagonal or pseudohexagonal. After the chemical crosslinking, the surface hardness has been improved significantly up to 1H-2H as compared to 1B-2B in the original KYNAR AQUATEC control. Chemical resistance to isopropyl alcohol (WA), ethanol (EtOH), methanol (MeOH), and 70% IPA based rubbing alcohol has also been improved significantly in spot tests.

TABLE 2

Modified KYNAR AQUATEC coatings on 2.1 mm PMMA sheets

| KYNAR AQUATEC coated PMMA sheets | Transmission (%, 548 nm) | Transmission (%, 632 nm) | Haze (%, 560 nm) |
|---|---|---|---|
| 2380 rpm Modified KYNAR AQUATEC w. 2287-on-PMMA | 93.87 | 93.74 | 1.26 |
| 2380 rpm Modified KYNAR AQUATEC w. 2287-on-PMMA | 93.97 | 93.75 | 1.45 |
| 2500 rpm Modified KYNAR AQUATEC w. 2287-on-PMMA | 94.02 | 93.43 | 1.22 |
| 2500 rpm Modified KYNAR AQUATEC w. 2287-on-PMMA | 94.03 | 93.47 | 1.35 |
| 2600 rpm Modified KYNAR AQUATEC w. 2287-on-PMMA | 94.01 | 93.48 | 1.29 |
| 2600 rpm Modified KYNAR AQUATEC w. 2287-on-PMMA | 94.04 | 93.51 | 1.43 |
| 2.1 mm PMMAsheet control | 92.63 | 92.58 | 0.40 |
| 2.1 mm PMMAsheet control | 92.67 | 92.67 | 0.49 |

Example 3

| Aqueous Latex Example 3 Latex Formulation | Amount (gm) |
|---|---|
| KYNAR AQUATEC RC-10,206 (70:30 PVDF-HFP:Acrylic at 50% solids) | 92 |
| Ammonia (28% aq.) | 0.16 |
| ACRYSOL RM-8W thickener (associative thickener) | 0.51 |
| EB | 6.60 |
| Water | 92 |
| Aziridine | 1 |
| MERGAL 680 (Troy) | 1 |
| Total | 193.27 |

Optical clear KYNAR AQUATEC coatings were diluted with D.I. water and modified with a biocide/fungicide agent MERGAL 680 and a cross-linking agent (aziridine) and then spincoated over to 3.0 mm clear PLEXIGLAS acrylic sheets at ambient temperature. The coatings were made on a single side (S) and also a double coating with a coating on each side (D). The coated samples were thermally cured at 65° C. for 60 minutes. High quality AQUATEC coated PMMA sheets exhibited higher optical transparency of up to 94.0% in the visible wavelength, vs 94.8% from double-side coated sheets. The haze levels of the coated sheets were controlled <1.5% from single layer coatings vs <2.5% from double-side coated sheets. The dry thickness of the coating on top of the PMMA sheet was less than 1 um. KYNAR AQUATEC coated PMMA sheets passed the crosshatch peel-off adhesion tests with no delamination as ranked at 5B (100%). The periodic structure of the nano moth-eye is at the scale of 163 nm. The depth of the nano moth-eye is ranged from 35-70 nm. The packing structure of the nano moth-eye is close to be hexagonal or psuedohexagonal. After the chemical crosslinking, the surface hardness has been improved significantly up to 1H-3H as compared to 1B-2B in the original KYNAR AQUATEC control. Chemical resistance to IPA, EtOH, MeOH, and 70% IPA based rubbing alcohol has also been improved in spot tests.

TABLE 3

Modified KYNAR AQUATEC coatings on 3.0 mm PMMA sheets

| KYNAR AQUATEC coated pMMA sheets | Transmission (%, 548 nm) | Transmission (%, 632 nm) | Haze (%, 560 nm) |
|---|---|---|---|
| 2500 rpm Modified KYNAR AQUATEC w. Aziridine-on-PMMA | 93.92 | 93.35 | 0.39 |
| 2500 rpm Modified KYNAR AQUATEC w. Aziridine-on-PMMA | 93.97 | 93.57 | 0.48 |
| 2800 rpm Modified KYNAR AQUATEC w. Aziridine-on-PMMA | 93.71 | 93.77 | 0.55 |
| 2800 rpm Modified KYNAR AQUATEC w. Aziridine-on-PMMA | 93.54 | 93.73 | 0.57 |
| 2900 rpm Modified KYNAR AQUATEC w. Aziridine-on-PMMA | 94.61 | 93.80 | 2.11 |
| 2900 rpm Modified KYNAR AQUATEC w. Aziridine-on-PMMA | 94.81 | 93.81 | 2.14 |
| 3.0 mm PMMA control | 92.55 | 92.57 | 0.13 |
| 3.0 mm PMMA control | 92.57 | 92.61 | 0.19 |

Example 4

| Aqueous Latex Example 4 Latex Formulation | Amount (gm) |
|---|---|
| KYNAR AQUATEC RC-10,206 (70:30 PVDF-HFP:Acrylic at 50% solids) | 92 |
| Ammonia (28% aq.) | 0.16 |
| ACRYSOL RM-8W thickener (associative thickener) | 0.51 |
| EB | 6.60 |
| Water | 92 |
| MERGAL 680 (Troy) | 1 |
| 3-Gylcidoxypropyl-trimethoxysilane 97% | 1 |
| Total | 193.27 |

Optical clear KYNAR AQUATEC coatings were diluted with D.I. water and modified with a biocide/fungicide agent MERGAL 680 and a cross-linking agent (3-Gylcidoxypropyl-trimethoxysilane-GPTMS) and then spincoated over to 3.0 mm clear PLEXIGLAS acrylic sheets at ambient temperature. The coated samples were thermally cured at 95° C. for 30 minutes. High quality KYNAR AQUATEC coated PMMA sheets exhibited higher optical transparency of up to 93.9% in the visible wavelength. The haze levels of the coated sheets were controlled <1% from single layer coatings. The dry thickness of the coating on top of the PMMA sheet was less than 1 um. KYNAR AQUATEC coated PMMA sheets passed the crosshatch peel-off adhesion tests with no delamination as ranked at 5B (100%). After the chemical crosslinking, the surface hardness has been improved significantly up to 1H-2H as compared to 1B-2B in the original KYNAR AQUATEC control. Chemical resistance to IPA, EtOH, MeOH, and 70% IPA based rubbing alcohol has also been improved in spot tests.

TABLE 4

Modified KYNAR AQUATEC coatings on 3.0 mm PMMA sheets

| KYNAR AQUATEC coated pMMA sheets | Transmission (%, 548 nm) | Transmission (%, 632 nm) | Haze (%, 560 nm) |
|---|---|---|---|
| 2300 rpm Modified KYNAR AQUATEC w. GPTMS-on-PMMA | 93.74 | 93.25 | 0.73 |
| 2300 rpm Modified KYNAR AQUATEC w. GPTMS-on-PMMA | 93.90 | 93.46 | 0.76 |
| 2500 rpm Modified KYNAR AQUATEC w. GPTMS-on-PMMA | 93.74 | 93.32 | 0.56 |
| 2500 rpm Modified KYNAR AQUATEC w. GPTMS-on-PMMA | 93.59 | 93.17 | 0.58 |
| 2800 rpm Modified KYNAR AQUATEC w. GPTMS-on-PMMA | 93.36 | 93.12 | 0.47 |
| 2800 rpm Modified KYNAR AQUATEC w. GPTMS-on-PMMA | 93.49 | 93.10 | 0.47 |
| 3.0 mm PMMA control | 92.57 | 92.61 | 0.30 |
| 3.0 mm PMMA control | 92.58 | 92.62 | 0.40 |

Example 5

| Aqueous Latex Example 5 | Amount (gm) |
|---|---|
| Latex Formulation | |
| KYNAR AQUATEC RC-10,206 (70:30 PVDF-HFP:Acrylic at 50% solids) | 92 |
| Ammonia (28% aq.) | 0.16 |
| ACRYSOL RM-8W thickener (associative thickener) | 0.51 |
| Dipropylene glycol methyl ether (DPM) | 6.62 |
| Water | 92 |
| MERGAL 680 (Troy) | 0.5 |
| Polyaziridine-28 | 0.75 |
| Total | 192.54 |

Optical clear KYNAR AQUATEC coatings were diluted with D.I. water and modified with a biocide/fungicide agent MERGAL 680 and a cross-linking agent (Polyaziridine-28) and then spincoated over to 3.0 mm clear PLEXIGLAS acrylic sheets at ambient temperature. The coated samples were thermally cured at 57-70° C. for 60 minutes. High quality AQUATEC coated PMMA sheets exhibited higher optical transparency of up to 94.2% in the visible wavelength. The haze levels of the coated sheets were controlled <6% from single layer coatings. The dry thickness of the coating on top of the PMMA sheet was less than 1 um. KYNAR AQUATEC coated PMMA sheets passed the crosshatch peel-off adhesion tests with no delamination as ranked at 5B (100%). After the chemical crosslinking, the surface hardness has been improved significantly up to 1H-2H as compared to 1B-2B in the original KYNAR AQUATEC control. Chemical resistance to IPA, EtOH, MeOH, and 70% IPA based rubbing alcohol has also been improved in spot tests.

TABLE 5

Modified KYNAR AQUATEC coatings on 3.0 mm PMMA sheets

| KYNAR AQUATEC coated pMMA MC sheets | Transmission (%, 548 nm) | Transmission (%, 632 nm) | Haze (%, 560 nm) |
|---|---|---|---|
| 2500 rpm Modified KYNAR AQUATEC w. PZ-28-on-PMMA (57 C.) | 93.87 | 94.26 | 4.88 |
| 2500 rpm Modified KYNAR AQUATEC w. PZ-28-on-PMMA (57 C.) | 94.04 | 94.25 | 4.95 |
| 1800 rpm Modified KYNAR AQUATEC w. PZ-28-on-PMMA (70 C.) | 93.72 | 93.31 | 4.34 |
| 1800 rpm Modified KYNAR AQUATEC w. PZ-28-on-PMMA (70 C.) | 93.67 | 93.49 | 4.43 |
| 2500 rpm Modified KYNAR AQUATEC w. PZ-28-on-PMMA (70 C.) | 94.22 | 94.12 | 5.03 |
| 2500 rpm Modified KYNAR AQUATEC w. PZ-28-on-PMMA (70 C.) | 93.91 | 93.10 | 5.23 |
| 3.0 mm PMMA control | 92.58 | 92.57 | 0.13 |
| 3.0 mm PMMA control | 92.57 | 92.61 | 0.19 |

Example 6

| Aqueous Latex Example 6 | Amount (gm) |
|---|---|
| Latex Formulation | |
| KYNAR AQUATEC RC-10,206 (70:30 PVDF-HFP:Acrylic at 50% solids) | 92 |
| Ammonia (28% aq.) | 0.16 |
| ACRYSOL RM-8W thickener (associative thickener) | 0.51 |
| Dipropylene glycol methyl ether (DPM) | 6.62 |
| Water | 92 |
| MERGAL 680 (Troy) | 0.5 |
| COATOSIL 1770 epoxy silane (GE) | 3.75 |
| Total | 195.54 |

KYNAR AQUATEC fluoropolymer coating was modified with D.I. water, a biocide/fungicide agent MERGAL 680 and COATOSIL 1770 epoxy silane at ambient temperature for more than 3 hrs and degassed. Then it was spincoated over 2.1 mm clear PLEXIGLAS sheets with a high Tg and the sheet samples were baked at 90° C. for 20 minutes. High quality KYNAR AQUATEC coated PMMA sheets exhibited higher optical transparency of up to 93.7% in the visible wavelength, as compared to 92.6% in the 2.1 mm PLEXIGLAS PMMA sheets. The average haze levels of the coated sheets were controlled around <1%. KYNAR AQUATEC coated PMMA sheets passed the crosshatch peel-off adhesion tests with no delamination as ranked at 5B (100%). After the chemical crosslinking, the surface hardness has been improved significantly up to 1H-2H as compared to 1B-2B in the original KYNAR AQUATEC control. Chemical resistance to IPA, EtOH, MeOH, and 70% IPA based rubbing alcohol has also been improved in spot tests.

TABLE 6

Modified KYNAR AQUATEC coatings on 2.1 mm PMMA sheets

| KYNAR AQUATEC coated PMMA sheets | Transmission (%, 548 nm) | Transmission (%, 632 nm) | Haze (%, 560 nm) |
|---|---|---|---|
| 2490 rpm Modified KYNAR AQUATEC w. 1770-on-PMMA | 93.59 | 93.27 | 0.87 |
| 2490 rpm Modified KYNAR AQUATEC w. 1770-on-PMMA | 93.73 | 93.25 | 0.87 |
| 2600 rpm Modified KYNAR AQUATEC w. 1770-on-PMMA | 93.65 | 93.27 | 0.95 |
| 2600 rpm Modified KYNAR AQUATEC w. 1770-on-PMMA | 93.72 | 93.26 | 0.98 |
| 2700 rpm Modified KYNAR AQUATEC w. 1770-on-PMMA | 93.58 | 93.47 | 0.74 |
| 2700 rpm Modified KYNAR AQUATEC w. 1770-on-PMMA | 93.77 | 93.42 | 0.79 |
| 2.1 mm PMMA sheet control | 92.66 | 92.66 | 0.22 |
| 2.1 mm PMMA sheet control | 92.73 | 92.73 | 0.31 |

Example 7

| Aqueous Latex Example 7 | Amount (gm) |
|---|---|
| Latex Formulation | |
| KYNAR AQUATEC RC-10,206 (70:30 PVDF-HFP:Acrylic at 50% solids) | 92 |
| Ammonia (28% aq.) | 0.16 |
| ACRYSOL RM-8W thickener (associative thickener) | 0.51 |
| Dipropylene glycol methyl ether (DPM) | 6.62 |
| Water | 92 |
| MERGAL 680 (Troy) | 0.5 |
| Polyaziridine-28 | 0.85 |
| Total | 192.64 |

Optical clear KYNAR AQUATEC coatings were diluted with D.I. water and modified with a biocide/fungicide agent MERGAL 680 and a cross-linking agent (Polyaziridine-28) and then coated over 70 um clear PMMA-b-polybutyl acrylate (PBA)-b-PMMA triblock polymer optical films (containing 35% PBA) at ambient temperature. The coated samples were thermally cured at 55° C. for 60 minutes. High quality AQUATEC coated acrylic films exhibited higher optical transparency of up to 94.2% in the visible wavelength vs. 92.8% in the control acrylic block polymer films. The haze levels of the coated films were controlled <3% from single layer coatings. The dry thickness of the coating on top of the acrylic block polymer sheet was at 500 nm-3 um. KYNAR AQUATEC coated acrylic polymer films passed the crosshatch peel-off adhesion tests with no delamination as ranked at 5B (100%). After the chemical cross-linking, the surface hardness has been improved significantly up to 1H-3H as compared to 1B-2B in the original KYNAR AQUATEC control. Chemical resistance to IPA, EtOH, MeOH, and 70% IPA based rubbing alcohol has also been improved in spot tests.

TABLE 7

Modified KYNAR AQUATEC Coatings on 70 um PMMA-b-PBA-b-PMMA films

| Single layer coated PMMA sheets | Transmission (%, 548 nm) | Transmission (%, 632 nm) | Haze (%, 560 nm) |
|---|---|---|---|
| 3μ KYNAR AQUATEC-on-PMMA film | 93.80 | 93.74 | 0.98 |
| 3μ KYNAR AQUATEC-on-PMMA film | 93.78 | 93.73 | 1.11 |
| ~1μ KYNAR AQUATEC-on-PMMA film | 94.21 | 94.21 | 2.92 |
| ~1μ KYNAR AQUATEC-on-PMMA film | 94.19 | 94.16 | 2.95 |
| 70 um PMMA-b-PBA-b-PMMA film | 92.85 | 92.84 | 0.35 |
| 70 um PMMA-b-PBA-b-PMMA film | 92.86 | 92.84 | 0.37 |

Example 8

| Aqueous Latex Example 8 | Amount (gm) |
|---|---|
| Latex Formulation | |
| KYNAR AQUATEC RC-10,206 (70:30 PVDF-HFP:Acrylic at 50% solids, 180 nm) | 92 |
| Ammonia (28% aq.) | 0.16 |
| ACRYSOL RM-8W thickener (associative thickener) | 0.51 |
| Dipropylene glycol methyl ether (DPM) | 6.62 |
| Water | 62 |
| MERGAL 680 (Troy) | 0.5 |
| Polyaziridine (PZ-28) | 1.05 |
| Total | 162.84 |

180 nm latex based KYNAR AQUATEC fluoropolymer coating was modified with D.I. water, a biocide/fungicide agent MERGAL 680 and polyaziridine at ambient temperature. After being degassed, it was spincoated over 2.6 mm clear PLEXIGLAS sheets with a high Tg and the sheet samples were baked at 90° C. for 20 minutes. High quality KYNAR AQUATEC coated PMMA sheets exhibited higher optical transparency of up to 94.1% in the visible wavelength, as compared to 92.6% in the 2.6 mm PLEXIGLAS sheets. The average haze levels of the coated sheets were controlled around <1.5%. KYNAR AQUATEC coated PMMA sheets passed the crosshatch peel-off adhesion tests with no delamination as ranked at 5B (100%). After the chemical crosslinking, the surface hardness has been improved significantly up to 1H-2H as compared to 1B-2B in the original KYNAR AQUATEC control. Chemical resistance to IPA, EtOH, MeOH, and 70% WA based rubbing alcohol has also been improved in spot tests.

TABLE 8

Modified KYNAR AQUATEC coatings (180 nm) on 2.6 mm PMMA sheets

| 180 nm KYNAR AQUATEC coated PMMA sheets | Transmission (%, 548 nm) | Transmission (%, 632 nm) | Haze (%, 560 nm) |
|---|---|---|---|
| 2390 rpm Modified KYNAR AQUATEC w. PZ-28-on-PMMA | 94.06 | 93.93 | 1.11 |

TABLE 8-continued

Modified KYNAR AQUATEC coatings (180 nm) on 2.6 mm PMMA sheets

| 180 nm KYNAR AQUATEC coated PMMA sheets | Transmission (%, 548 nm) | Transmission (%, 632 nm) | Haze (%, 560 nm) |
|---|---|---|---|
| 2390 rpm Modified KYNAR AQUATEC w. PZ-28-on-PMMA | 94.05 | 93.56 | 1.25 |
| 2490 rpm Modified KYNAR AQUATEC w. PZ-28-on-PMMA | 94.02 | 93.58 | 1.02 |
| 2490 rpm Modified KYNAR AQUATEC w. PZ-28-on-PMMA | 94.14 | 93.82 | 1.04 |
| 2560 rpm Modified KYNAR AQUATEC w. PZ-28-on-PMMA | 93.64 | 94.12 | 1.09 |
| 2560 rpm Modified KYNAR AQUATEC w. PZ-28-on-PMMA | 94.09 | 93.68 | 1.12 |
| 2.6 mm PMMA sheet control | 92.65 | 92.71 | 0.12 |
| 2.6 mm PMMA sheet control | 92.67 | 92.73 | 0.16 |

Example 9

| Aqueous Latex Example 9 | Amount (gm) |
|---|---|
| Latex Formulation | |
| KYNAR AQUATEC RC-10,206 (70:30 PVDF-HFP:Acrylic at 50% solids) | 92 |
| Ammonia (28% aq.) | 0.16 |
| ACRYSOL RM-8W thickener (associative thickener) | 0.51 |
| Dipropylene glycol methyl ether (DPM) | 6.62 |
| Water | 92 |
| MERGAL 680 (Troy) | 0.5 |
| COATOSIL 1770 epoxy silane (GE) | 1.05 |
| Total | 192.84 |

Optical clear KYNAR AQUATEC coatings were diluted with D.I. water and modified with a biocide/fungicide agent MERGAL 680 and a cross-linking agent (COATOSIL 1770 epoxy silane) and then coated over 170 um clear LEXAN (GE) polycarbonate films at ambient temperature. The coated samples were thermally cured at 60° C. for 60 minutes. High quality KYNAR AQUATEC coated PC sheets exhibited higher optical transparency of up to ~92% in the visible wavelength. The haze levels of the coated sheets were controlled <1.5% from single layer coatings. The dry thickness of the coating on top of the PC sheet was at 1-3 um. KYNAR AQUATEC coated PC sheets passed the crosshatch peel-off adhesion tests with no delamination as ranked at 5B (100%). After the chemical crosslinking, the surface hardness has been improved significantly up to 1H-3H as compared to 1B-2B in the original KYNAR AQUATEC control. Chemical resistance to IPA, EtOH, MeOH, and 70% IPA based rubbing alcohol has also been improved in spot tests.

TABLE 9

Modified KYNAR AQUATEC Coatings on 170 um PC films

| | Transmission (%, 548 nm) | Transmission (%, 632 nm) | Haze (%, 560 nm) |
|---|---|---|---|
| 3μ KYNAR AQUATEC w. 1770-on-PC film | 91.56 | 92.04 | 0.48 |
| 3μ KYNAR AQUATEC w. 1770-on-PC film | 91.45 | 92.03 | 0.49 |
| ~1μ KYNAR AQUATEC w. 1770-on-PC film | 91.94 | 92.28 | 0.99 |
| ~1μ KYNAR AQUATEC w. 1770-on-PC film | 91.87 | 92.22 | 1.03 |
| 170 um PC film control | 88.97 | 88.71 | 0.26 |
| 170 um PC film control | 88.94 | 88.72 | 0.27 |

Example 10

| Latex Formulation (10) | Amounts (gm) |
|---|---|
| Part A. | |
| KYNAR AQUATEC ® RC-10259 (50:50 PVDF-HFP:Acrylic at 50% solids | 50 |
| NMP | 1.0 |
| BYK 346 (wetting agent from Byk Chemie) | 0.09 |
| Water | 20 |
| Part B. | |
| BAYHYDUR 302 (Hexamethyl Diisocyanate from Bayer Material Science) | 3.9 |

Optical clear KYNAR AQUATEC coatings containing acid/hydroxy functional groups were diluted with D.I. water and modified with NMP/BYK346 and a cross-linking agent BAYHYDUR 302 (Hexamethyl Diisocyanate from Bayer MaterialScience). The formulated solution then was coated over 125 um clear pretreated PET (Melinex 454 from Du Pont) films at ambient temperature. The coated samples were thermally cured at 60° C. for 15 minutes and then 80° C. for 15 minutes. High quality KYNAR AQUATEC coated PET sheets exhibited higher optical transparency of up to ~91% in the visible wavelength. The haze levels of the coated sheets were controlled <2.0% from single layer coatings. The dry thickness of the coating on top of the PET sheet was at 1-3 um. KYNAR AQUATEC coated PET sheets passed the crosshatch peel-off adhesion tests with no delamination as ranked at 48-5B (95-100%). After the chemical crosslinking, the surface hardness has been improved significantly up to HB-1H as compared to 2B in the original KYNAR AQUATEC control without be crosslinked. Chemical resistance to IPA, EtOH, MeOH, and 70% IPA based rubbing alcohol has been improved in spot tests.

TABLE 10

Modified KYNAR AQUATEC Coatings on 125 um PET films

| | Transmission (%, 548 nm) | Transmission (%, 632 nm) | Haze (%, 560 nm) |
|---|---|---|---|
| ~3μ KYNAR AQUATEC w. B302-on-PET film | 91.20 | 91.51 | 1.99 |
| ~2μ KYNAR AQUATEC w. B302-on-PET film | 91.27 | 91.55 | 1.94 |

TABLE 10-continued

Modified KYNAR AQUATEC Coatings on 125 um PET films

| | Transmission (%, 548 nm) | Transmission (%, 632 nm) | Haze (%, 560 nm) |
|---|---|---|---|
| ~1µ KYNAR AQUATEC w. B302-on-PET film | 91.32 | 91.57 | 1.89 |
| 125 um MELINEX 454 PET film control | 89.87 | 89.94 | 1.49 |
| 125 um MELINEX 454 PET film control | 89.78 | 89.92 | 1.52 |

What is claimed is:

1. A coated substrate comprising:
  a) a dry optically clear moth-eye nano-structured film, having a dry thickness of less than 1 micron; wherein said dry optically clear moth-eye nano-structured film comprises distinct, crosslinked nano-structured polymer particles comprising a functional acrylic-modified polyvinylidene fluoride copolymer containing at least 50 mole percent of vinylidene fluoride monomer units, wherein said distinct, crosslinked nano-structured polymer particles are cross-linked with a cross-linker selected from the group consisting of triaziridine, polyaziridine, glycidoxy propyl trimethoxy silane, glycidoxy propyl triethoxy silane, epoxy silane, beta-(3,4-epoxycylohexyl) ethyl triethoxy silane and their blends, and having an average particle size of less than 300 nm, and
  b) a flat optically clear acrylic polymer substrate,
wherein said dry optically clear moth-eye nano-structured film is directly adhered to the flat optically clear acrylic polymer substrate, wherein said distinct, crosslinked nano-structured particles are in the form of a packed hexagonal or pseudo-hexagonal structure fully covering the flat optically clear acrylic polymer substrate, wherein said distinct crosslinked nano-structured polymer particles do not coalesce over time or at elevated temperatures, and wherein light transmittance at a wavelength of 550 nm is greater than 93 percent, and is improved by at least 1 percent compared to the flat optically clear acrylic polymer substrate that is uncoated.

2. The coated substrate of claim 1, wherein said distinct crosslinked, nano-structured polymer particles have an average particle size of less than 250 nm.

3. The coated substrate of claim 2, wherein said distinct crosslinked, nano-structured polymer particles have an average particle size of from 80-200 nm.

4. The coated substrate of claim 1, wherein said distinct crosslinked, nano-structured polymer particles have a particle size distribution such that 90 weight percent of the particles fall within +/−30 percent of the weight average particle size.

5. The coated substrate of claim 1, wherein said distinct crosslinked, nano-structured polymer particles have a particle size distribution such that 90 weight percent of the particles fall within +/−20 percent of the weight average particle size.

6. The coated substrate of claim 5, wherein the light transmittance at a wavelength of 550 nm is greater than 94 percent.

7. The coated substrate of claim 1, wherein said acrylic polymer substrate comprises at least 50 weight percent of methylmethacrylate monomer units.

8. The coated substrate of claim 1, wherein said dry optically clear polymeric moth-eye nanostructured film has a haze level of 2 percent or less.

9. The coated substrate of claim 8, wherein said dry optically clear polymeric moth-eye nanostructured film has a haze level of 1 percent or less.

10. The coated substrate of claim 1, wherein the light transmittance at a wavelength or 550 nm is improved by at least 1.5 percent compared to the flat optically clear acrylic polymer substrate that is uncoated.

11. The coated substrate of claim 1, wherein said dry optically clear polymeric moth-eye nanostructured film is applied as an aqueous emulsion or dispersion.

12. The coated substrate of claim 1, wherein said cross-linker is present at from 0.5 to 1.05 weight percent based on the total weight of polymer solids in the the dry optically clear moth-eye nano-structure film.

* * * * *